Dec. 29, 1959  L. R. WICKLIFF  2,918,771
PACKAGING APPARATUS
Filed Aug. 23, 1954  2 Sheets-Sheet 1
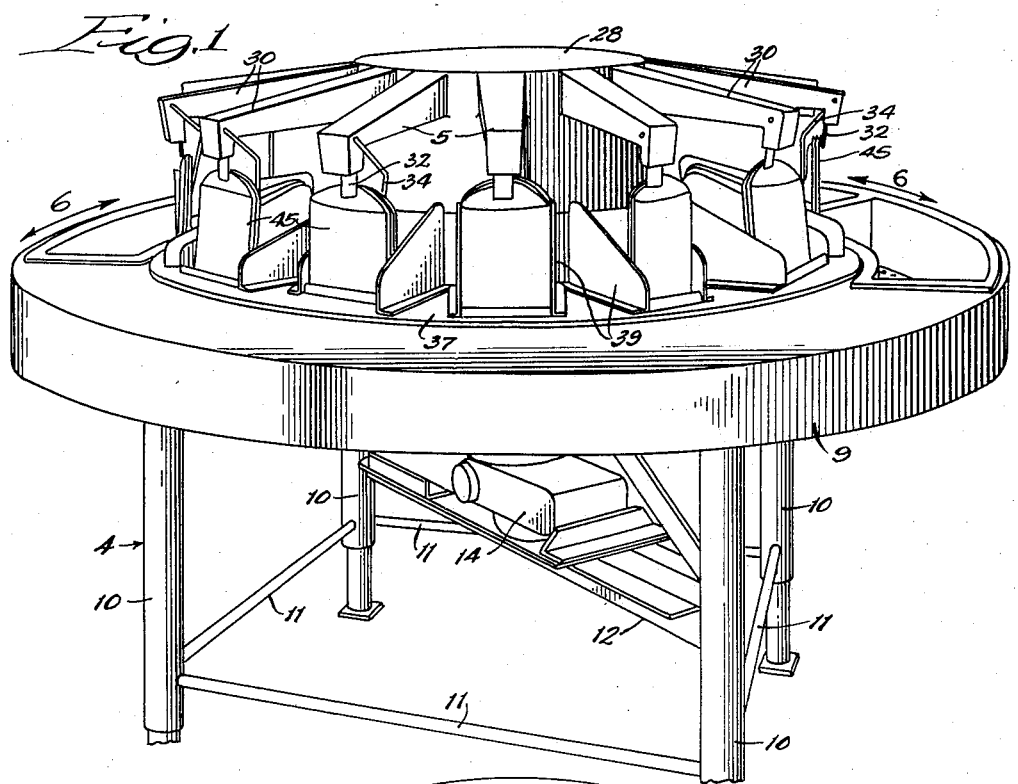
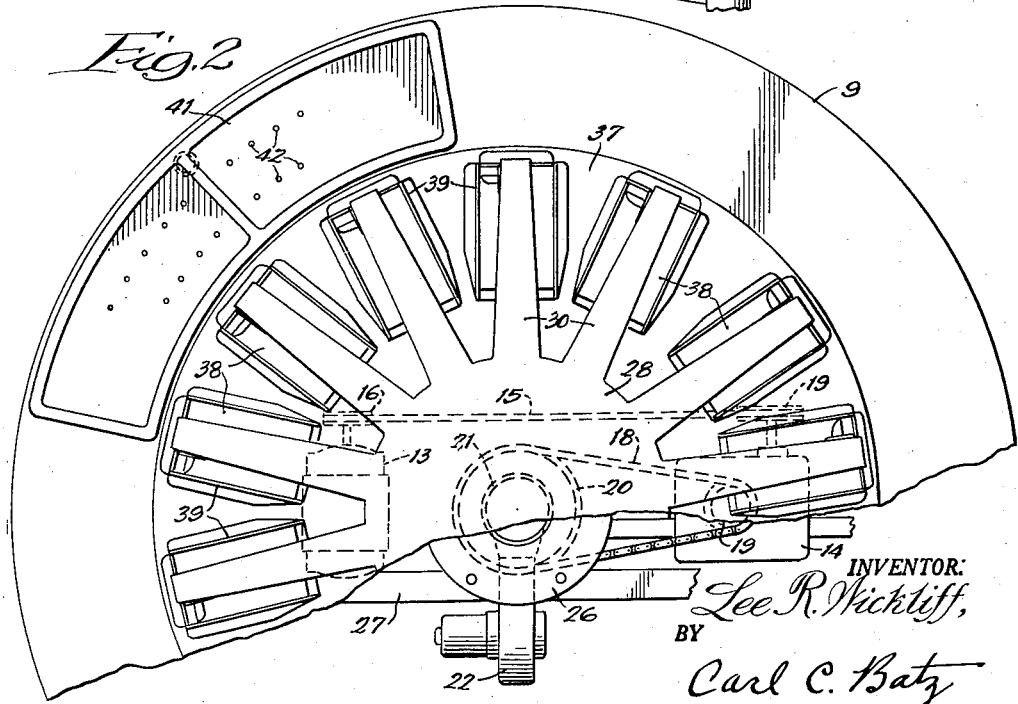
INVENTOR:
Lee R. Wickliff,
BY
Carl C. Batz
ATTORNEY Dec. 29, 1959 L. R. WICKLIFF 2,918,771
PACKAGING APPARATUS
Filed Aug. 23, 1954 2 Sheets-Sheet 2
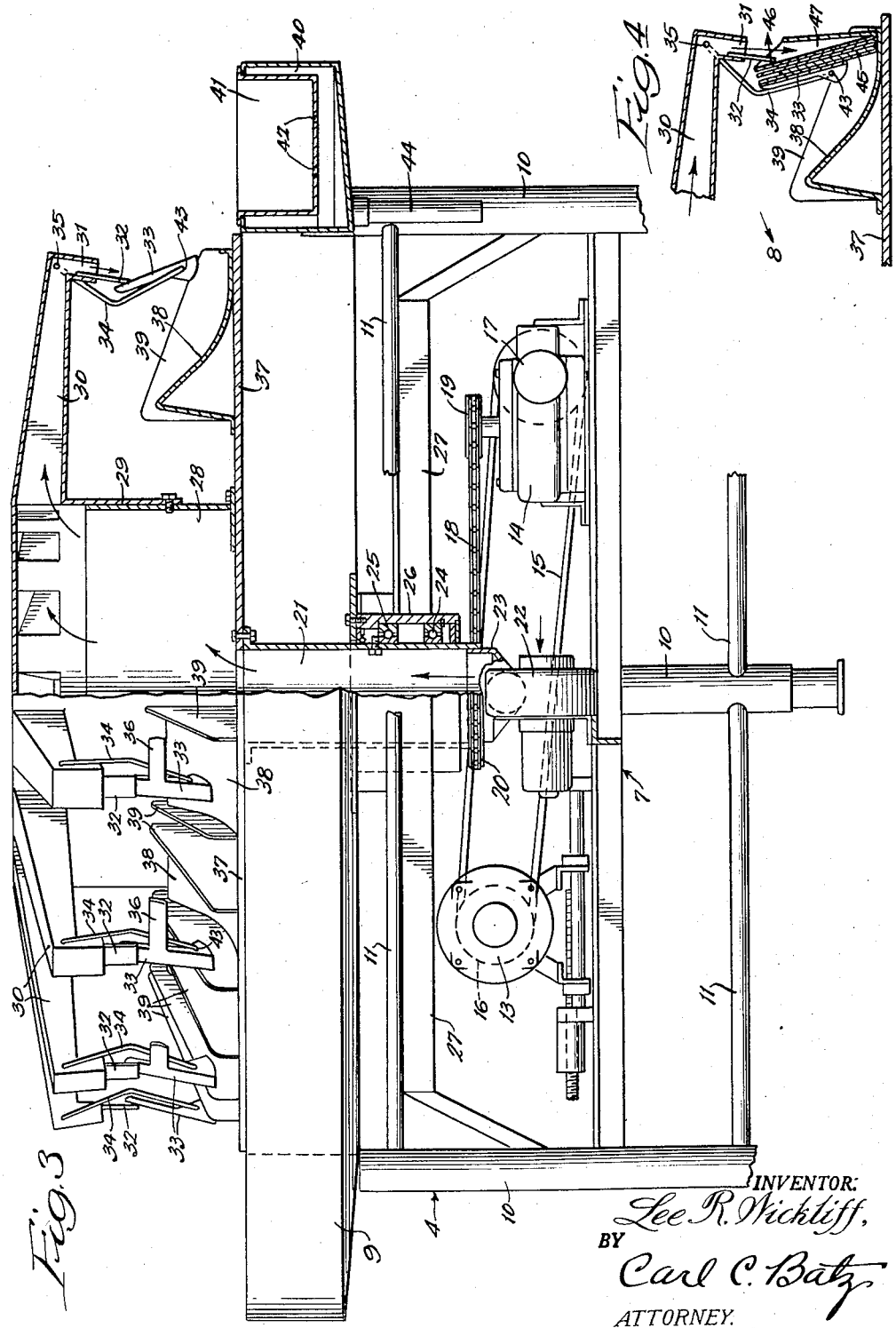
INVENTOR:
Lee R. Wickliff,
BY
Carl C. Batz
ATTORNEY.

United States Patent Office 2,918,771
Patented Dec. 29, 1959

2,918,771

PACKAGING APPARATUS

Lee R. Wickliff, Bentonville, Ark., assignor to Armour and Company, Chicago, Ill., a corporation of Illinois Application August 23, 1954, Serial No. 451,599

5 Claims. (Cl. 53—189)

This invention relates to apparatus for packaging portable articles in envelope-type containers which is especially applicable for bagging poultry giblets but which may be utilized with any like series of articles.

It is a principal object of my invention to provide apparatus for mechanically producing large quantities of a package unit containing a series of portable articles.

A further principal object is to provide a device for transforming collapsed or folded pouches such as bags and sacks into receptacles for portable articles.

Still another object is to provide an apparatus, incorporating this pouch transforming device, for packaging a series of portable articles in inexpensive containers at an extremely rapid rate.

It is an object of this invention to provide an apparatus which may be readily adjusted for handling envelope-type containers of different sizes and shapes.

A further object of the invention is to provide movable container conveying apparatus and stationary article feeding stations wherein the containers are moved past the feeding stations and receive a series of portable articles therefrom.

Yet another object of the invention is to provide container conveying apparatus and article feeding stations of rotary character wherein the containers are rotated past the feeding stations and receive a series of portable articles therefrom.

Still another object is to provide means of forcing air into an envelope being conveyed past an article feeding station whereby the envelope is held open for receiving portable articles.

Other objects and advantages will be apparent in the following detailed description of the invention.

One embodiment of the invention is illustrated in the accompanying drawings in which:

Fig. 1 is a perspective view of the apparatus showing the essential elements in operative position;

Fig. 2 is a broken plan view showing the relationship between container supports and feeding stations;

Fig. 3 is a side view of the apparatus partly in cross section to show the constructive details of the apparatus; and Fig. 4 is a detailed sectional view illustrating the container holding structure.

Summarily, the machine includes a frame 4, container supports 5, stationary feeding stations 6, a source of forced air, a driving mechanism 7, and envelope holding devices 8, whereby air is projected into an envelope being conveyed on the holding devices opening such envelope to receive articles from the feeding stations.

The frame 4 may be of any suitable structure, but in the illustrated embodiment (Fig. 1) has a tabular portion 9 resting on legs of adjustable height 10 connected by cross members 11, and by supports 12. These supports provide a base for the driving mechanism (Fig. 3) which includes a motor 13 and a speed reducer 14 which communicates with the motor by means of an endless belt 15 running on pulleys 16 and 17 and communicates with a rotary element through an endless roller chain 18 traveling on sprocket wheels 19 and 20.

Sprocket wheel 20 is fastened to an upright tube 21 which at its bottom communicates with air blower 22 by means of a slip joint 23, and which at its top is bolted to circular plate 37. Tube 21 rotates on ball bearings 24 traveling in ring races 25 which unit is enclosed by a tubular structure 26. The latter structure is fastened to cross members 27 which in turn are supported by legs 10.

Circular plate 37 also has mounted thereon drum 28, which communicates with tube 21 and with radial fixed arms 30, and which is provided with vertically overlapping sides 29 permitting adjustment of the drum height for handling envelopes of different sizes.

At the mouth ends 31 of arms 30 (Fig. 4) are fixed fingers or tongues 32 which engage envelope backer plates 33. The weight of such backer plates urges them toward tongues 32. The backer plates are provided with right angle projections 36 furnishing additional support for the envelopes. These backer plates are attached to arms 30 through positioning or following rods 34 which rods are pivotally connected to the arms at point 35 and to the backer plates at point 43. Circular plate 37 is provided with an arcuate magazine 38 and sectional dividers 39, for the stacked envelopes.

Tabular element 9 is provided with a plurality of vertical depressions 40 (Figs. 2 and 3) in which are inserted removable trays or pans 41 having perforations 42 communicating with drain pipe 44.

The apparatus may be provided with any number of radial arms, and if desired can be constructed in an equiangular configuration. Similarly, any number of feeding stations may be utilized in conjunction with the container holding devices. It will be further understood that the arms and stations may suitably be of any size or shape.

Operation

It will be apparent from the above description that the machine is applicable for packaging a large variety of portable articles differing in kind, shape and size. However, for illustrative purposes, the following description of operation is given in connection with the bagging of poultry giblets.

In the large scale processing of poultry as a dressed meat product, the giblets including heart, liver, gizzard, and neck are usually removed from the fowl during an evisceration procedure. The giblets may then be assembled and packaged as a specialty item or separately bagged and handled as a unit with the dressed fowl.

In practicing my invention, the hearts, livers, etc. are collected separately during the killing operation, i.e. the hearts, livers, etc. are each collected in a different receptacle. Normally, the giblet portions are then rinsed or cleansed to remove undesirable occluded materials. I have provided drain pans 41 (Figs. 1 and 3) for this purpose. These pans or trays are inserted in the depressions 40 of the tubular structure 9 and residual liquid is drained from the giblets through perforations 42 and collectively removed through drain pipe 44.

In my apparatus, it is desirable to use envelopes having an elongated side or tab. This tab is preferably a flap edge which may then be employed as a closure for the container (Figs. 1 and 4). A stack of these envelopes is placed in the arcuate magazine 38 so that the flap edges all fit between abutment 32 and backing plate 33. Projection 36 of the backing plate provides additional support for the envelopes. The weight of the backer plate forces the envelope flaps outward against abutment 32 thereby rigidly supporting the envelopes during filling.

The guide or connecting rod 34 positions the backer plate with respect to the abutting bar.

A blower 22 forces air upward through tube 21 into drum 28 and then outward through arms 30. At the mouth end 31 of arms 30, the air is directed downward against the upper portion 46 of the outer or first envelope in the stack 47. The air is deflected from the flap edge into the envelope proper, and pressure is exerted upon the opposing side, i.e. the shorter side of the envelope. This side is forced outward, away from the elongated side, producing an expanded or inflated receptacle, capable of being filled with portable articles.

The envelope remains in the inflated state until at least the first article has been introduced therein. This article will usually provide a wedge which holds the envelope in an open position until filled. If desired, the air is forced into the envelope, continuously, during the filling operation. As the articles are dropped or tossed into the container they will be caught in the continuous current of air, thereby being directed into the envelope and thereby facilitating the filling operation.

The driving mechanism rotates tube 21 which, in turn, provides rotation of the envelope holders past the article feeding stations 41. At each of such stations a heart, or liver, or grizzard, or neck is introduced into the expanded outer envelope. When the envelope has received its quota of giblets, the filled bag is removed from the container holder, and the continuous current of air is then directed into the next envelope in the stack thereby transforming such envelope into a receptacle, in the same manner as was the first envelope. This systematic series of steps is continued until the stacks of envelopes have been depleted, whereupon the machine can be stopped and the envelopes replaced before starting up again.

In connection with the illustrated embodiment, filling of the envelopes proceeds manually. At each of the feeding stations, an operator introduces a giblet into each envelope as it rotates past the station, i.e. each operator will introduce one of a designated series of articles into the containers, such as a heart or a liver, etc. If desired, the feeding stations may be situated so that one operator can handle more than one giblet (Fig. 2). When an envelope has received its complement of giblets or articles, the envelope is removed from the rotating support by another operator. This operator may close the containers or pack them in crates or cartons for shipment or storage. Further, this operator(s) may perform an inspection of the containers to ascertain the completeness of the fill. If desired, the filled bags may be removed from the packaging apparatus and transferred to another area for additional handling.

It is also possible to ascertain the accuracy with which the bags were filled by computing the ratio of bags to the number of fowls slaughtered. Further, an estimation of differences between the number of individual giblets in different drain pans will yield a similar result.

This simple method of determining overfill or underfill is exemplary of the simple but efficient operation of my apparatus.

As noted above, the height of drum 28 may be adjusted by increasing or decreasing the overlap of sides 29. This adjustment regulates the distance between the radial arms and the circular base plate, thereby making it possible to handle different sized envelopes with the apparatus.

One specific form of the apparatus has been illustrated, and its operation described in connection with the bagging of poultry giblets. But it will be understood that the apparatus is susceptible of considerable modification and adapted to the packaging of a variety of portable articles while still within the scope of my invention.

I claim:

1. In apparatus for packaging a series of portable articles, an upright tube, means for rotating said tube, supports adapted to receive stacked envelopes and adapted to rotate with said tube, a plurality of arms radially extending from said tube and adapted to rotate with said tube, said arms being hollow and communicating with an envelope in the stack, and means for forcing air into said tube and through said arms to be projected into said envelopes to hold them open for receiving said articles.

2. In apparatus for packaging portable articles, an upright tube, supports adapted to receive stacked envelopes and adapted to rotate with said tube, a plurality of arms radially extending from said tube and adapted to be rotated with said tube, said arms being hollow and communicating with one of the envelopes in the stack on said supports, means for rotating said tube to convey said supports past stationary article-feeding stations, and means for forcing air into said tube and through said arms to be projected into one of the envelopes in said stack to hold it open for receiving said articles as said supports are conveyed past said feeding stations.

3. In apparatus for packaging a series of portable articles, an upright tube communicating with a plurality of radially extending arms, supports adapted to receive stacked envelopes having tabs thereon, said supports being adapted to rotate with said tube, means for rotating said tube to convey said supports past stationary article-feeding stations, said arms being hollow and communicating with the envelopes in the stacks proximate to said feeding stations, and means for forcing air into said tube and through said arms to be directed against said tabs and hold the envelopes open for receiving said articles as said supports are conveyed past said feeding stations.

4. In apparatus for packaging a series of portable articles, a drum communicating with an upright tube and with a plurality of hollow arms radially extending from said drum, means for rotating said tube to convey said arms past circumjacent stationary article-feeding stations, supports adapted to receive stacked envelopes with tabs and adapted to rotate with said arms, said supports being such that the envelopes in the stacks are proximate to said feeding stations and communicate with the openings in said arms, and means for forcing air into said tube to be directed through said arms against the tabs of the envelopes to hold said envelopes open for receiving said articles as said supports are conveyed past said feeding station.

5. In apparatus for packaging a series of portable articles, a frame supporting a series of pans containing said articles, a drum communicating with an upright tube and having a plurality of hollow arms radially extending from said drum, means for rotating said arms past the circular series of pans, supports adapted to receive stacked envelopes and adapted to rotate with said arms, said hollow arms communicating with the envelopes in the stacks proximate to the circular series of pans, and means for forcing air through said arms into the envelopes to hold them open for receiving said articles as said supports are rotated past said pans.

References Cited in the file of this patent

UNITED STATES PATENTS

| | | |
|---|---|---|
| 2,234,951 | Belcher | Mar. 18, 1941 |
| 2,633,281 | Rasmusson | Mar. 31, 1953 |
| 2,655,301 | Reimer | Oct. 13, 1953 |
| 2,656,961 | Bevington | Oct. 27, 1953 |